United States Patent
Papple et al.

(10) Patent No.: US 10,386,072 B2
(45) Date of Patent: Aug. 20, 2019

(54) INTERNALLY COOLED DILUTION HOLE BOSSES FOR GAS TURBINE ENGINE COMBUSTORS

(71) Applicant: Pratt & Whitney Canada Corp., Longueuil (CA)

(72) Inventors: Michael Papple, Verdun (CA); Si-Man Amy Lao, Toronto (CA); Sri Sreekanth, Mississauga (CA)

(73) Assignee: Pratt & Whitney Canada Corp., Longueuil, Quebec (CA)

(*) Notice: Subject to any disclaimer, the term of this patent is extended or adjusted under 35 U.S.C. 154(b) by 787 days.

(21) Appl. No.: 14/843,197

(22) Filed: Sep. 2, 2015

(65) Prior Publication Data

US 2017/0059162 A1 Mar. 2, 2017

(51) Int. Cl.
| F23R 3/06 | (2006.01) |
| F23R 3/16 | (2006.01) |
| F23R 3/00 | (2006.01) |

(52) U.S. Cl.
CPC ............... F23R 3/16 (2013.01); F23R 3/002 (2013.01); F23R 3/06 (2013.01); F23R 2900/03042 (2013.01); F23R 2900/03044 (2013.01); F23R 2900/03045 (2013.01)

(58) Field of Classification Search
CPC .. F23R 3/002; F23R 3/06; F23R 3/045; F23R 2900/03041; F23R 2900/03044; F23R 2900/03045; F23R 2900/03042–03045; F23R 3/04; F23R 3/08
See application file for complete search history.

(56) References Cited

U.S. PATENT DOCUMENTS

| 4,653,279 A * | 3/1987 | Reynolds .................. F23R 3/06 60/755 |
| 7,000,397 B2 | 2/2006 | Pidcock et al. |
| 8,246,298 B2 | 8/2012 | Wilson |
| 8,647,053 B2 * | 2/2014 | Hsu ......................... F01D 9/023 415/115 |
| 8,677,759 B2 | 3/2014 | Kaleeswaran et al. |
| 8,833,084 B2 | 9/2014 | Carlisle |
| 2014/0007580 A1 | 1/2014 | Richardson et al. |
| 2015/0059344 A1 * | 3/2015 | Sandelis .................. F23R 3/06 60/722 |
| 2015/0159872 A1 | 6/2015 | Melton et al. |

FOREIGN PATENT DOCUMENTS

WO WO2014197045 12/2014

* cited by examiner

*Primary Examiner* — Gerald L Sung
*Assistant Examiner* — Rene D Ford
(74) *Attorney, Agent, or Firm* — Norton Rose Fulbright Canada LLP

(57) ABSTRACT

A cooling arrangement provides cooling around a dilution hole defined in a liner circumscribing a combustion chamber of a gas turbine engine. The cooling arrangement comprises a hollow boss projecting from an outer surface of the liner about the dilution hole. The hollow boss defines an internal cavity extending circumferentially around the dilution hole. The internal cavity has an inlet in fluid flow communication with an air plenum surrounding the liner and an outlet in fluid flow communication with the combustion chamber.

19 Claims, 5 Drawing Sheets

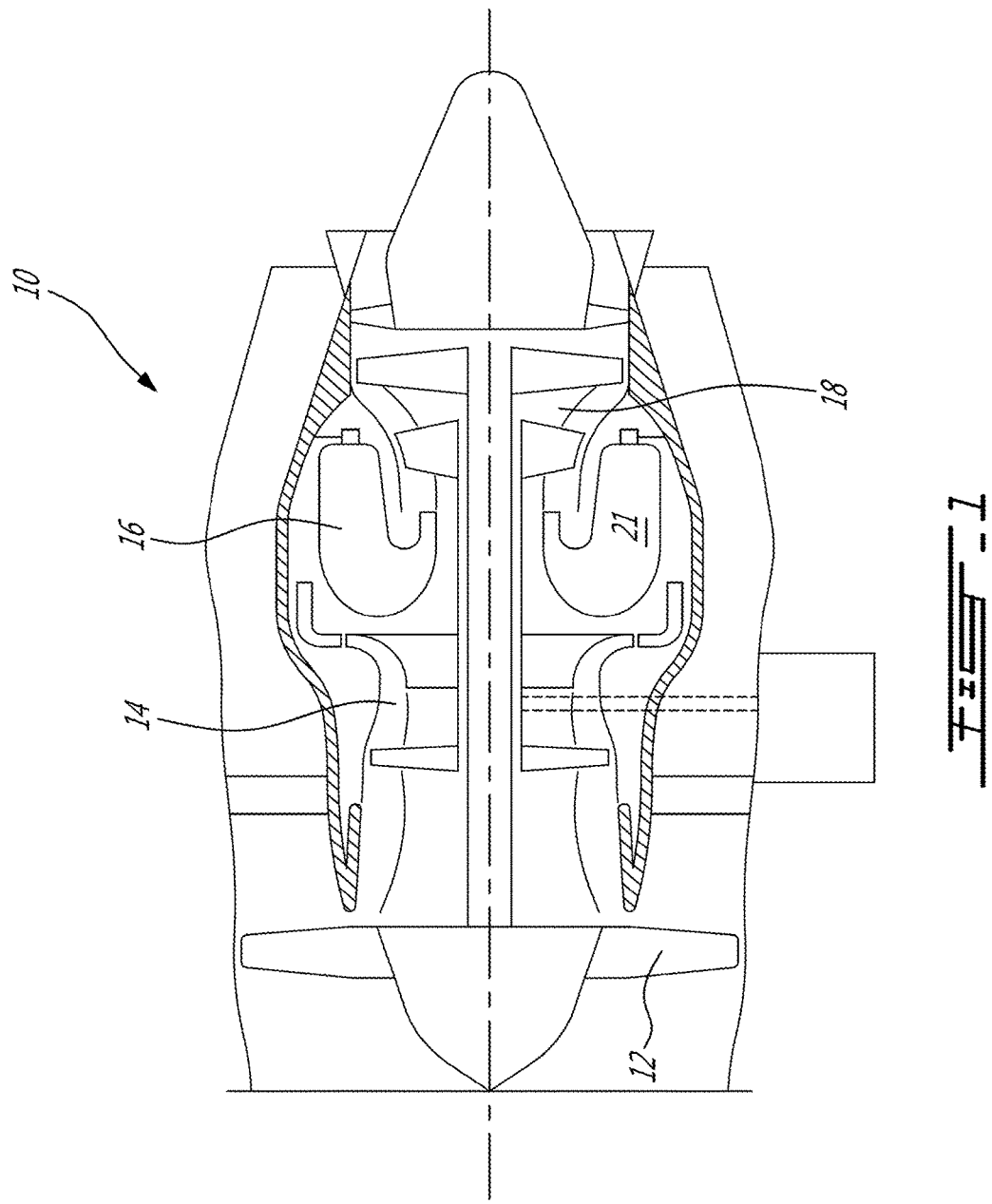

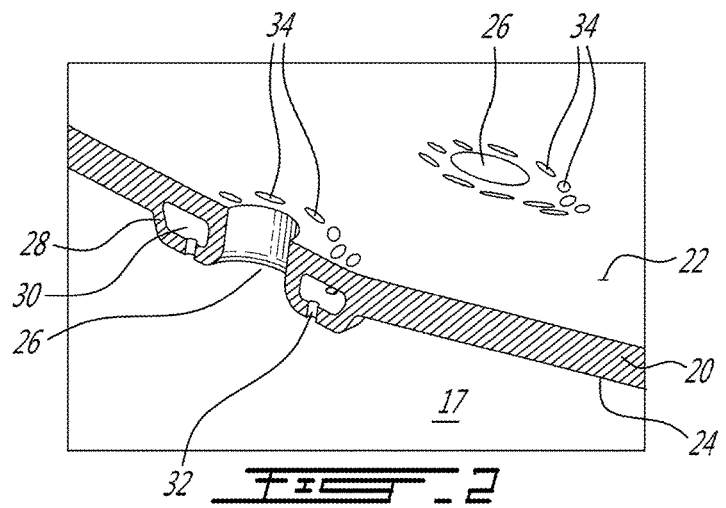
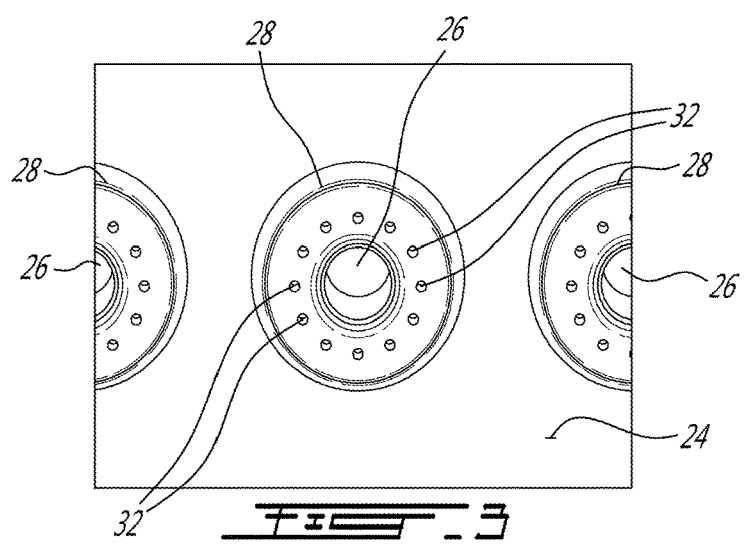
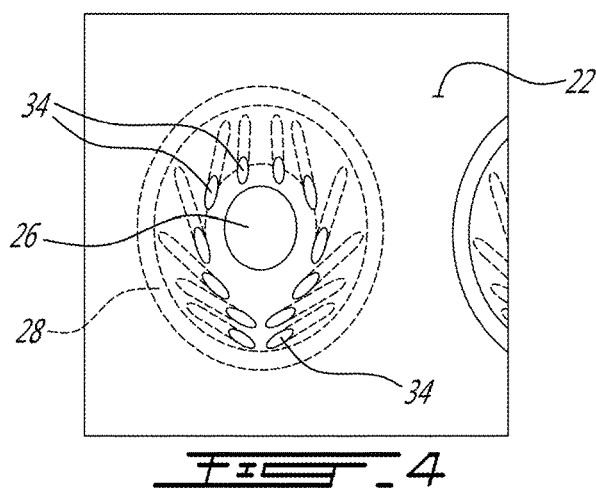

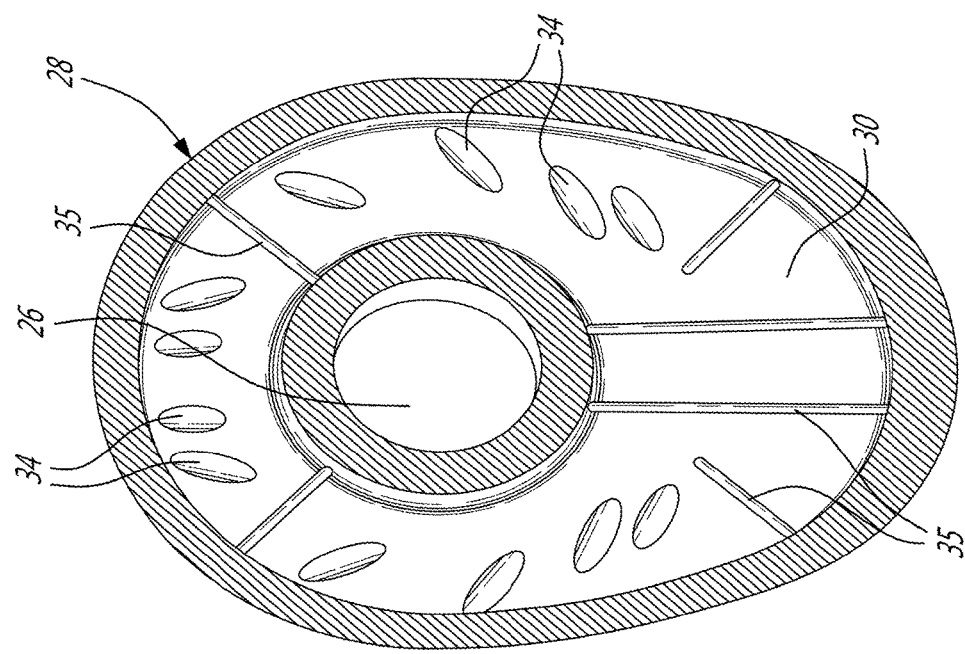
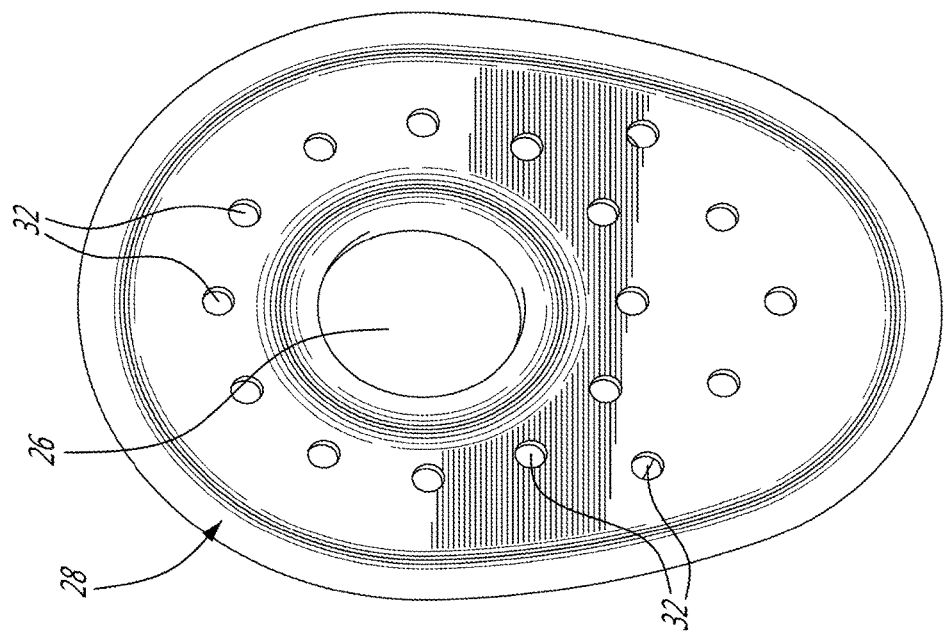

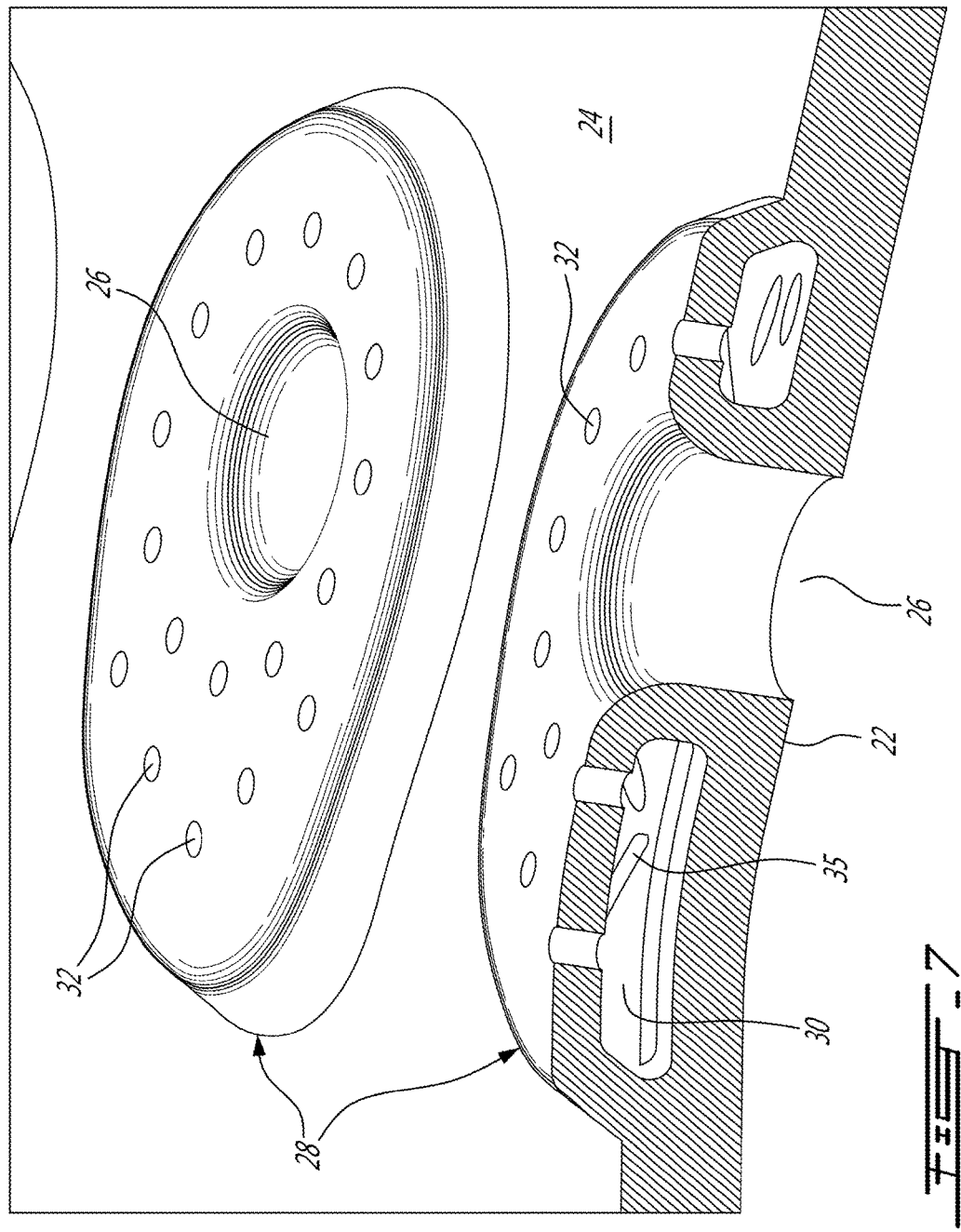

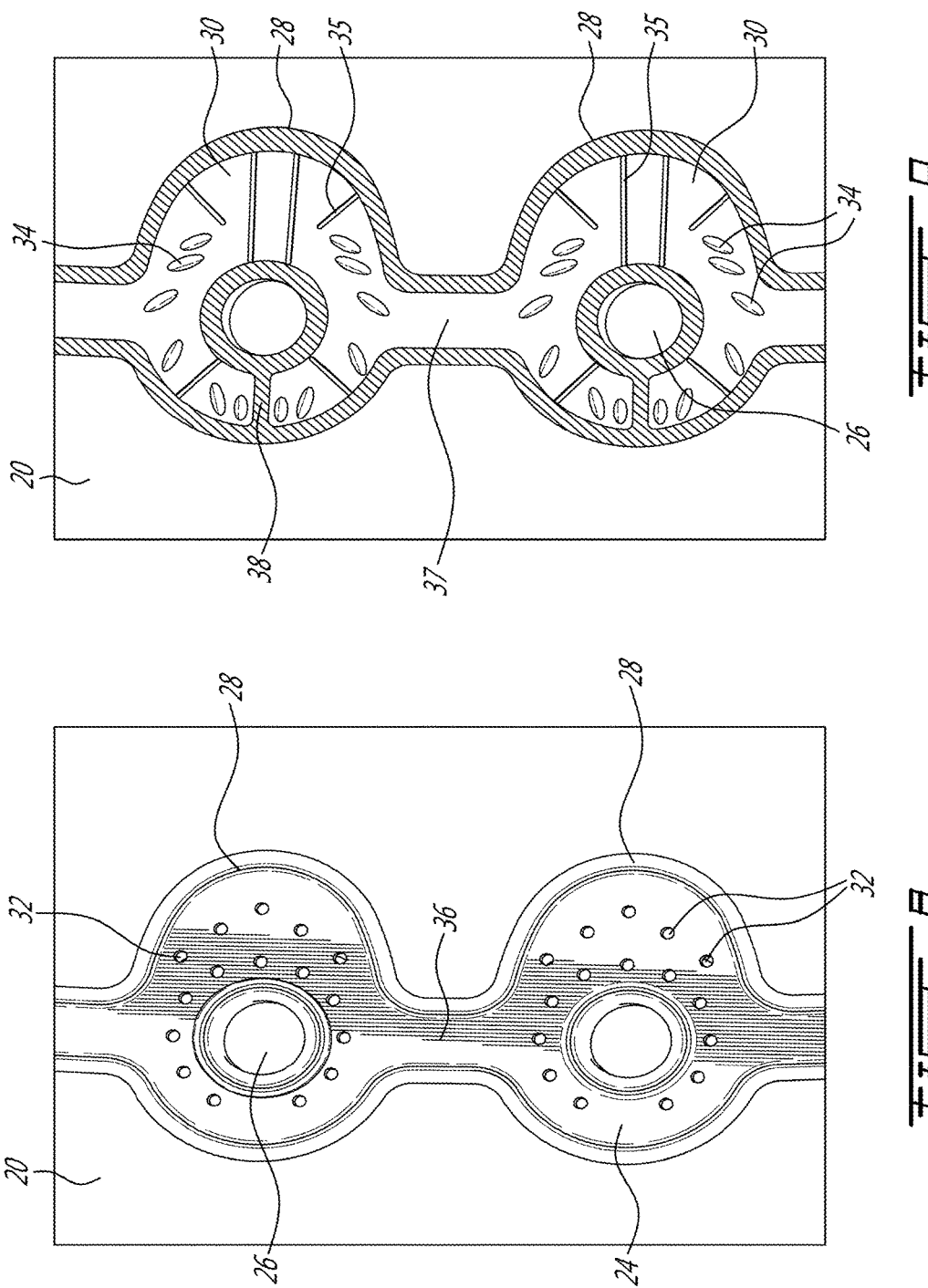

INTERNALLY COOLED DILUTION HOLE BOSSES FOR GAS TURBINE ENGINE COMBUSTORS

TECHNICAL FIELD

The application relates generally to gas turbine engines and, more particularly, to cooling around combustor dilution holes.

BACKGROUND OF THE ART

Combustor dilution holes create strong jets of air that drives specific characteristics of the burning gasses within the combustion chamber. These jets generate large recirculation zones and wakes on the hot surface of the surrounding combustor liner. This makes the region both hotter and more difficult to cool. Residual cooling film from upstream regions, if any, is easily blown away once it nears these features. Additional cooling air would help keep metal temperatures in design range. On the other hand, too much cooling air exhausted around these jets can interfere with the combustion process which is also undesirable. Due to limited space between holes and often awkward geometry, some regions cannot channel sufficient air. High metal temperatures around these dilution holes cause significant oxidation and/or cracking; leading to poor quality jets which eventually lead to performance changes within the combustor.

SUMMARY

Therefore, in accordance with one aspect, there is provided a combustor for a gas turbine engine, the combustor comprising a liner defining a combustion chamber, the liner having an inner surface facing the combustion chamber and an outer surface opposite the inner surface, a set of dilution holes extending through the liner, and a corresponding set of hollow bosses integral to the liner and extending about respective ones of the dilution holes, each hollow boss defining an internal cavity extending about the associated dilution hole, each hollow boss having an inlet defined in the outer surface of the liner for admitting cooling air into the internal cavity and an outlet extending through the inner surface of the liner for discharging the cooling air from the internal cavity into the combustion chamber.

In accordance with another general aspect, there is provided a cooling arrangement for providing cooling around a dilution hole defined in a liner circumscribing a combustion chamber of a gas turbine engine, the cooling arrangement comprising: a hollow boss projecting from an outer surface of the liner about the dilution hole, the hollow boss defining an internal cavity extending circumferentially around the dilution hole, the internal cavity having an inlet in fluid flow communication with an air plenum surrounding the liner and an outlet in fluid flow communication with the combustion chamber.

In accordance with a still further general aspect, there is provided a combustor for a gas turbine engine, the combustor comprising a liner defining a combustion chamber, the liner having an inner surface facing the combustion chamber and an outer surface opposite the inner surface, a dilution hole extending through the liner, a boss integrally formed in the liner about the dilution hole, the boss defining an internal cavity in the liner around the dilution hole, a set of inlet holes defined in the outer surface of the liner for admitting cooling air into the internal cavity, and a set of outlet holes defined in the inner surface of the liner for discharging the cooling air from the internal cavity into the combustion chamber.

DESCRIPTION OF THE DRAWINGS

Reference is now made to the accompanying figures in which:

FIG. 1 is a schematic cross-section view of a gas turbine engine;

FIG. 2 is an isometric cross-section view of a portion of a combustor liner illustrating bosses integrally formed in the combustor liner about respective dilution holes, each boss defining an internal cavity for receiving cooling air from a plurality of inlet holes on a cold side of the combustor, outlet holes being provided on the hot side of the combustor for discharging the cooling air from the internal cavity of the bosses;

FIG. 3 is a cold outer side view of the bosses shown in FIG. 2;

FIG. 4 is a hot inner side view illustrating a boss internal cavity and the outlet holes thereof;

FIG. 5 is a cold outer side view of a boss which has been widened in one direction to cool a larger surface area around the dilution hole;

FIG. 6 is a section view of the hollow boss shown in FIG. 5 illustrating film holes and trip-trips in the boss cavity;

FIG. 7 is an isometric cross-section view of a boss sectioned axially to show trip-strips in the boss cavity on the underside of the combustor liner;

FIG. 8 is a cold outer side view of bosses which have been connected to each other; and FIG. 9 is a section view of the hollow bosses shown in FIG. 8 illustrating internal cavities which have been connected to each other. Also shown is an internal cavity which does not completely surround a dilution hole.

DETAILED DESCRIPTION

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

The combustor 16 is housed in a plenum 17 supplied with compressed air from compressor 14. The combustor 16 comprises a liner 20 defining a combustion chamber 21. The liner 20 has a hot inner surface 22 facing the combustion chamber 21 and a back surface or cold outer surface 24 facing the plenum 17. The combustor liner 20 typically includes one or more rows of apertures, known as dilution holes 26, which allow a portion of the air from the plenum 17 to enter the combustion chamber 21 and mix with burning gases. The dilution holes 26 are not to be confused with the cooling holes (not shown) extending through the liner for cooling the same. The dilution holes 26 are used to introduce dilution air into the combustion zone of the combustor. The dilution air quenches the flames so as to control the gas temperature to which the turbine hardware downstream of the combustor will be exposed. The quenching also reduces the level of NOx emissions in the engine exhaust. The dilution holes 26 are generally far smaller in number than the cooling holes, and each dilution hole 26 has a cross-sectional area that is substantially greater than the cross-sectional area of one of the cooling holes. The dilution holes 26 are typically arranged in a circumferentially extending row. As mentioned hereinbefore, the dilution holes 26 create strong jets of air that drives specific characteristics of the burning gasses within the combustion chamber 21. The dilution air generates large recirculation zones and wakes on the inner surface 22 of the liner 20. This makes the region around the dilution holes 26 more difficult to cool.

As shown in FIG. 2, a hollow boss 28 that incorporates internal passages with cooling air may be integrally formed in the liner 20 about each individual dilution hole 26 to maximize heat removal about the dilution holes 26.

More particularly, according to the embodiment shown in FIGS. 2 to 4, each boss 28 integrally projects from the outer surface 24 of the liner 20 about a corresponding one of the dilution holes 26. In the illustrated embodiment, each boss 28 has a low profile donut shape. However, it is understood that the bosses 28 could adopt other suitable configurations. Each boss 28 defines an internal cavity 30 around the associated dilution hole 26. According to the illustrated embodiment, the internal cavity 30 is provided in the form of an annulus with an oblong cross-section. It is understood that the internal cavity 30 may be even more widened in any desired direction away from the dilution hole 26 to provide cooling over a larger surface area. Notably, the boss and its internal cavity can be widened in a downstream direction relative to the combustion gases flowing through the combustor. This can for instance be appreciated from FIGS. 5 and 6. The internal cavity 30 extends circumferentially continuously about the dilution hole 26. From FIGS. 2 to 4, it can be appreciated that each internal cavity 30 encircles the associated dilution hole 26.

Each internal cavity 30 has an inlet for allowing cooling air in the plenum 17 to flow therein. For instance, a circular array of uniformly distributed inlet holes 32 may be defined atop of each boss 28. The distribution of the inlet holes 32 may however vary over the outer surface area of the boss as for instance shown in FIG. 5. Each internal cavity 30 also has an outlet for discharging the spent cooling air into the combustion chamber 21. For instance, a set of outlet holes 34 may extend from the internal cavity 30 through the inner surface 22 of the liner 20 to the combustion chamber 21 around each dilution holes 26. Each set of outlet holes 34 is in fluid flow communication with a corresponding one of the boss internal cavity 30 for discharging the cooling air circulated therethrough into the combustion chamber 21.

According to the illustrated embodiment, the inlet holes 32 are provided in the form of impingement holes oriented to direct impingement jets against the back surface (i.e. the cold outer surface 24) of the liner 20 within the boss internal cavities 30. Heat transfer augmentation features 35 (FIGS. 6, 7 and 9), such as trip-strips or pin-fins, could be provided on the back surface of the liner 20 within each boss internal cavity 30.

The outlet holes 34 may be provided in the form of film holes for forming a cooling film on the inner surface 22 of the combustor liner 20. The film holes do not have to be straight—they can be curved to form longer cooling passages, and their exits can be located further downstream.

In operation, cooling air from the plenum 17 enters the inlet holes 32 from the cold outer surface 24 of the liner 20. The air flowing through the inlet holes 32 impinges against the back side of the liner within the boss internal cavities 30. Then, the cooling air follows a curved or shaped passage (i.e. internal cavity 30) around each dilution hole rim in the liner 20 before exiting into the combustion chamber 21 via outlet holes 34. The cooling air passing through the outlet holes 34 provides for the formation of a cooling film on the inner surface 22 of the liner 20. The curved or annular shape of the internal cavity 30 conforms to the boss 28, enabling a more even temperature distribution. This provides for increase cooling effectiveness around the combustor dilution holes 26 and, thus, better durability of the combustor liner 20. This is particularly true for single skin combustors.

As shown in FIGS. 8 and 9, one or more bosses 28 may be connected by a bridge 36. This allows internal cavities 30 to be connected to each other by a connector 37. This configuration is advantageous when the dilution holes 26 are closely spaced. Also shown in FIG. 9 is a wall 38. This illustrates that the internal cavity 30 does not have to completely encircle the dilution hole.

It is understood that other technologies, such as rifled holes, worm holes or internal impingement, can be combined to make the cooling even more effective. Also, the internal cavities 30 could be made wider to cover a larger surface area around the dilution holes 26 (FIGS. 5 and 6). The bosses 28 could be locally thickened to incorporate other cooling features, such as impingement, pin fin, trip strip and any other suitable heat transfer augmentation features (FIGS. 6 and 7).

The above description is meant to be exemplary only, and one skilled in the art will recognize that changes may be made to the embodiments described without departing from the scope of the invention disclosed. Any modifications which fall within the scope of the present invention will be apparent to those skilled in the art, in light of a review of this disclosure, and such modifications are intended to fall within the appended claims.

The invention claimed is:

1. A combustor for a gas turbine engine, the combustor comprising: a liner defining a combustion chamber, the liner having an inner surface facing the combustion chamber and an outer surface opposite the inner surface, a set of dilution holes extending through the liner, and a set of hollow bosses integral to the liner and, wherein the set of hollow bosses comprises a corresponding hollow boss extending about a corresponding dilution hole of the set of dilution holes, such that each hollow boss corresponds to each dilution hole of the set of dilution holes, each corresponding hollow boss defining an internal cavity extending about each corresponding dilution hole, each hollow boss having an inlet defined in the outer surface of the liner for admitting cooling air into the internal cavity and an outlet extending through the inner surface of the liner outside of the corresponding dilution hole for discharging the cooling air from the internal cavity into the combustion chamber, wherein a connector channel provides a cooling fluid path between a first internal cavity of a first boss of the set of hollow bosses and a second internal cavity of a second boss of the set of hollow bosses, wherein the connector channel has a smaller width measured with respect to a downstream direction of combustion gases flowing through the combustor than the width of the first boss and second boss measured in the downstream direction.

2. The combustor defined in claim 1, wherein the internal cavity of each hollow boss at least partly encircles each corresponding dilution hole and is sealed therefrom.

3. The combustor defined in claim 1, wherein the internal cavity of each hollow boss is provided in the form of an annulus which is widened in a direction away from each corresponding dilution hole.

4. The combustor defined in claim 1, wherein heat transfer augmentation features are provided in the internal cavity of at least one of the hollow bosses.

5. The combustor defined in claim 4, wherein the outlet comprises a set of outlet holes extending from the internal cavity through the inner surface of the liner, and wherein the heat transfer augmentation features are interspersed between the outlet holes.

6. The combustor defined in claim 1, wherein the inlet comprises a set of impingement holes distributed atop of the set of hollow bosses.

7. The combustor defined in claim 1, wherein the outlet comprises a set of outlet holes extending from the internal cavity through the inner surface of the liner to the combustion chamber.

8. The combustor defined in claim 7, wherein the outlet holes are film cooling holes configured to form a film of cooling air on the inner surface of the liner.

9. A combustor for a gas turbine engine, the combustor comprising: a liner defining a combustion chamber, the liner having an inner surface facing the combustion chamber and an outer surface opposite the inner surface, a first dilution hole and a second dilution hole extending through the liner, a first boss and a second boss integrally formed in the liner about the first dilution hole and the second dilution hole, respectively, the first boss defining a first internal cavity in the liner around the first dilution hole, the second boss defining a second internal cavity in the liner around the second dilution hole, a set of inlet holes defined in the outer surface of the liner for admitting cooling air into the first internal cavity and the second internal cavity, and a set of outlet holes defined in the inner surface of the liner for discharging the cooling air from the first internal cavity and the second internal cavity into the combustion chamber, and a connector channel providing a cooling fluid path between the first internal cavity of the first boss and the second internal cavity of the second boss, wherein the connector channel has a smaller width measured with respect to the downstream direction of combustion gases flowing through the combustor than the width of the first boss and second boss measured in the downstream direction.

10. The combustor defined in claim 9, wherein the first internal cavity extends at least partly around the first dilution hole.

11. The combustor defined in claim 10, wherein the first internal cavity is provided in the form of an annulus widened in a direction away from the first dilution hole.

12. The combustor defined in claim 9, wherein heat transfer augmentation features are provided on an internal cavity surface of the first boss.

13. The combustor defined in claim 12, wherein the heat transfer augmentation features are interspersed between the outlet holes.

14. The combustor defined in claim 9, wherein the inlet holes are provided in the form of impingement holes distributed atop of the first and the second boss.

15. The combustor defined in claim 9, wherein the first boss has a donut shape.

16. The combustor defined in claim 9, wherein the outlet holes are provided in the form of film cooling holes configured to provide for the formation of a cooling film on the inner surface of the liner.

17. A cooling arrangement for providing cooling around dilution holes defined in a liner circumscribing a combustion chamber of a gas turbine engine, the cooling arrangement comprising: a first hollow boss projecting from an outer surface of the liner about a first dilution hole, the hollow boss defining a first internal cavity extending circumferentially around the first dilution hole, the first internal cavity having an inlet in fluid flow communication with an air plenum surrounding the liner and an outlet disposed outside of the first dilution hole and in fluid flow communication with the combustion chamber, a second hollow boss projecting from the outer surface of the liner about a second dilution hole, the second hollow boss defining a second internal cavity extending circumferentially around the second dilution hole, wherein a connector channel provides a cooling fluid path between the first internal cavity of the first hollow boss and the second internal cavity of the second hollow boss, the connector channel having a smaller width measured with respect to a downstream direction of combustion gases flowing through the combustor than the width of the first hollow boss and the second hollow boss measured in the downstream direction.

18. The cooling arrangement defined in claim 17, wherein the inlet comprises a set of impingement holes defined in the first hollow boss and oriented to direct impingement jets directly against the outer surface of the liner within the first internal cavity.

19. The cooling arrangement defined in claim 18, wherein the outlet comprises a set of film holes extending through an inner surface of the liner.

* * * * *